United States Patent [19]

Croisier et al.

[11] 3,777,130

[45] Dec. 4, 1973

[54] DIGITAL FILTER FOR PCM ENCODED SIGNALS

[75] Inventors: Alain Croisier, Cagnes; Daniel J. Esteban, La Gaude; Marc E. Levilion; Vladimir Riso, both of Nice, all of France

[73] Assignee: International Business Machines Corporation, Armonk, N.Y.

[22] Filed: Dec. 15, 1971

[21] Appl. No.: 208,345

[30] Foreign Application Priority Data

Dec. 17, 1970 France .............................. 7047123

[52] U.S. Cl. ................................ 235/152, 235/156

[51] Int. Cl. .......................... G06f 1/02, G06f 15/34

[58] Field of Search .................... 235/152, 156, 164; 328/162; 333/18; 325/41, 42

[56] References Cited

UNITED STATES PATENTS

| | | | |
|---|---|---|---|
| 3,579,102 | 5/1971 | Hatley | 325/42 |
| 3,619,586 | 11/1971 | Hoff et al. | 235/152 X |
| 3,543,012 | 11/1970 | Courtney | 235/152 UX |
| 3,521,042 | 7/1970 | Blerkom et al. | 235/156 |
| 3,521,041 | 7/1970 | Blerkom et al. | 235/156 |
| 3,446,949 | 5/1969 | Trimble | 235/156 X |

*Primary Examiner*—Malcolm A. Morrison
*Assistant Examiner*—James F. Gottman
*Attorney*—Robert B. Brodie et al.

[57] ABSTRACT

A digital filter either of a recursive or transversal type responsive to successive digitally encoded analog signal samples of m bits each. The filter comprises an accumulator for multiplying and summing a weighted hybrid value obtained from a memory medium addressed by a selected one of the m bits of each of N digitally encoded signal samples. If the bits of the N samples used for addressing the memory are derived from successive input signals only, then the filter is of the transversal type. If V of the N signals whose bits are used for addressing are from the input samples and R of the N signals whose bits also are used for addressing are obtained from filter output signals, then the filter is recursive. By addressing the memory with the binary value of like bit positions of the signal samples, then a hybrid value may be stored, which hybrid value need only be multiplied and combined by the accumulator. This permits the use of a substantially smaller memory than that required if the digits of the signals looked up the completed weighted function.

4 Claims, 9 Drawing Figures

DIGITAL FILTER FOR PCM ENCODED SIGNALS

BACKGROUND OF THE INVENTION

This invention relates to a digital filter, the responses of which is computed digitally through readings of binary words recorded in a memory medium, said filter accumulating the words read out of said memory.

In the prior art bulk memory was used in conjunction with digital filtering as a technique for simplifying or eliminating the multiplier portions of such filters. A typical filter transfer function would relate the filter output Y to a series of input signals X(NT), X(NT-T) and/or prior output signals Y(NT-T) according to the relation :

$$Y(NT) = a_1 X (NT) + a_2 X (NT\text{-}T) + a_2 Y (NT\text{-}T).$$

If the coefficients could be read out from a bulk memory and applied to arm multiplier elements only when used then the customary elaborate resistive weighting networks might be simplified or eliminated. L. B. Jackson in U.S. Pat. No. 3,522,546 filed Feb. 29, 1968 shows such an approach for a transversal digital filter. In a related development, A. J. Deerfield in U.S. Pat. No. 3,370,292 issued on Feb. 20, 1968 taught that a reference table addressable by an intermediate value in a digital filtering sequence could be used to provide values that could be logically combined with input signals in a feedforward path and in a feedback path. However, the Deerfield arrangement was concerned neither with optimum memory capacity, multiplier elimination, and the use of the input signal elements to directly access the stored values of interest.

Study of digital filters shows that they can be built by using digital circuits processing multiplication on successive samples of the analog signal to be filtered, and adding the weightings so obtained. The use of these processes has been reserved for a long time, for the laboratories carrying out simulations to test the characteristics of the designed device. In these cases, the weighting factors chosen from an analysis of the transfer function of the desired filter, are stored and used by the computer under program control.

SUMMARY OF THE INVENTION

It is accordingly an object of this invention to devise a digital filter responsive to successive ordinary binary coded signal samples such as PCM of the type in which a bulk memory is used to obtain intermediate values, which values are subsequently accumulated. It is a related object that the filter be utilizable in either a transversal or recursive configuration and further that the memory be accessed in such a manner that its capacity can be minimized.

The foregoing objects are satisfied by an embodiment in successive binary coded signal samples $Z_i$ are considered as numbers of the form $2^{m-1} Z_i^m + \text{---} 2^{j-1} Z_i^j + +2^0 Z_i^1$. Relatedly, the output of the filter $Y$ is taken as a weighted function of $Z_i$, i.e., $$Y = \sum_{i=1}^{N} a_i Z_i$$

If $Z_i = \sum_{j=1}^{m} 2^{j-1} Z_i^j$, then $$Y = \sum a_i Z_i = \sum_{i=1}^{N} a_i \sum_{j=1}^{m} 2^{j-1} Z_i^j \qquad = \sum_{j=1}^{m} 2^{j-1} \sum_{i=1}^{N} a_i Z_i^j$$

$$Y = \sum_{j=1}^{m} 2^{j-1} Sj;\ Sj = \sum_{j=1}^{N} a_i z_i^j.$$

The invention contemplates utilizing the $j^{th}$ bit of each of the $N$ input signal samples of $M$ bits each in order to address the memory medium. Restated, $Z_1^j$, $Z_2^j$----$Z_N^j$ is applied directly to the memory medium to obtain a corresponding hybrid value, $Sj$. This is in turn applied to an accumulator where it is appropriately multipled $2^{j-1} Sj$ and combined to form the sum$\Sigma 2^{j-1} Sj$.

Because only $N$ bits address the memory, its capacity can be limited to $2^N$ different locations. This is in contrast with the prior art. Also, direct addressing by the filter input or output signals thus eliminating the costly serial processing logic found in the feedforward or feedback channels of some prior art systems.

DESCRIPTION OF THE PREFERRED EMBODIMENT

It is noted that a read only memory ROM is considered to be a device which holds permanent data not alterable by signal processing. In contrast, a random access memory RAM is a storage element designed to give a constant access time for any location addressed irrespective of the location previously addressed. In practice ROM usually has a constant access time, the difference between the ROM and RAM being that the information contents of the RAM may be alterable.

Figure 1:
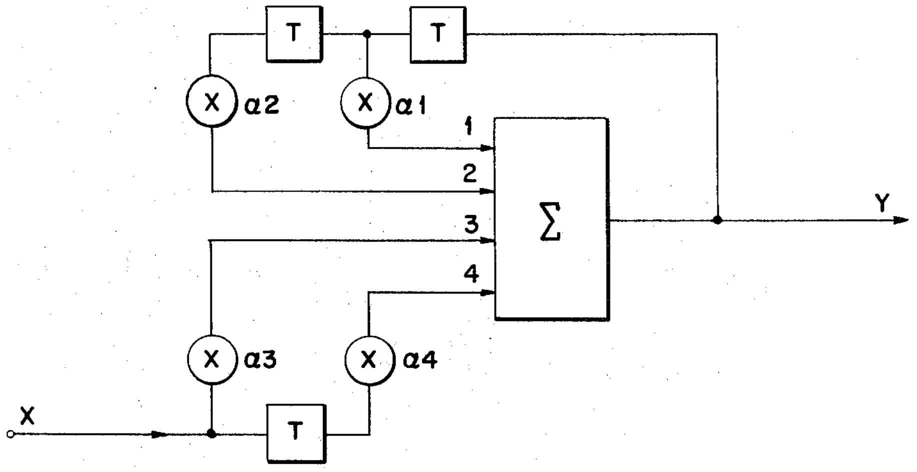
FIG. 1 shows the functional diagram of a recursive filter according to the prior art.

A transfer function of any filter, sampled at a frequency FS, can be synthetized by using a device carrying out the operations diagramatically shown on FIG. 1. The successive samples of the signal to be filtered X are transmitted through a delay line composed of cells with an elementary delay T equal to the sampling period. The signal, taken from the terminals of each T delayed call is multiplied by a given factor deduced, in accordance with the selected method, either from the pulse response or from the desired frequency transfer function. The section of the device carrying out these operations defines a section called "direct section". Then the results of these weightings are added in a Σ stage. The filtered output signal Y is re-injected into stage Σ after passing through a second delay line and after weighting operations performed with some other values of said factors $\alpha$, thus defining a section called "feedback section."

Thus, such a device involves multiplying and adding operations and it seems to be particularly interesting to carry out these operations by using personalized computers after conversion of the samples to be filtered in digital mode. In this case, each sample supplies a logic word, the bits of which, after passing through the various stages of a shift register, providing pure delays, processed in order to carry out the mathematical operations indicated above. In fact, the signal has often be already converted in digital mode, through modulation processes called PCM or Δ, for other processing needs and a device enabling direct filtering of these coded signals is particularly attractive. However, an essential difference should exist between the devices as they process Δ or PCM signals since in the last case, said devices would have to deal with the weight to be assigned to each bit of the PCM word, and with its sign, when in Δ modulation, these constraints do not exist except when the signal (Δ) is converted in (Δ) coded in PCM mode. These problems are particularly critical when building filters of the recursive type where the signals through the direct and feedback sections of the filter should necessarily be in the same code.

The assignee of this invention has already disclosed, in patent application No. PV 7040291 filed in France on Oct. 29, 1970 and now French Pat. No. 2,116,224 entitled "Filtre digital d'une information en code delta" ("Digital filter of a delta coded information"), a fully digital recursive filter. In this device, a ROM is used to store any combination corresponding to the results of the addition of the weighted values. Then, the memory is directly addressed by using a word supplied on the various taps of the delay line. The process used in this device may be applied to the filtering of a signal in PCM mode provided that the constituting elements have been adapted to take into account the particular PCM characteristics.

For example, a filter for PCM with five bit words may be synthetized by using a shifting register, the respective stages of which contain five bit positions. The outputs of every said stages being applied to a ROM adress decoder, said memory supplying as an output, the contribution of the bits affected with the same weight to the sum to be provided. To take into account the weights of the various binary bits, it is possible to use an accumulator composed of a binary adder followed by a shifting register and provided with a feedback loop.

In fact, the time relationships for a low pass or band pass filter similar to the one described referring to FIG. 1, at a sampling time $t$ equal to NT, where T is the sampling period can be written as follows:

$Y(NT) = \alpha_1\ Y(NT\text{-}T) + \alpha_2\ Y(NT\text{-}2T) + \alpha_3\ X(NT) + \alpha_4\ X(NT\text{-}T)$ where $\alpha_1$, $\alpha_2$, $\alpha_3$, $\alpha_4$ and the variables X and Y are supposed to be positive. (This system given as an example to introduce the sign necessity can be only an example).

The difference equation can be written in a compact form:

$$Y = \sum_{i=1}^{n} \alpha_i \cdot Z_i$$

where $= n$ is the number of weighting taps on the delay line or shift register.

$\alpha_i$ are the various weighting factors or coefficients such as $\alpha_1$, $\alpha_2$, $\alpha_3$, $\alpha_4$ ... deduced from a sampling of the pulse response or from the filter transfer function.

$Z_i$ is the value of samples $Y$ and $X$ of the second member of the above difference equation By calling $Z_i^j$, the $j^{st}$ bit of sample $Z_i$, in PCM with M bits, we obtain:

$$Z_i = \sum_{j=1}^{M} 2^{(j-1)} \cdot Z_i^j$$

in which $Z_i^j$=0 or 1 according to the value of the corresponding bit of sample $Z_i$, and $M$ is equal to the number of bits of a sample word. It should be understood that the number $M$ is defined with the same accuracy as the anticipated results.

Then, the above equation can be written:

$$Y = \sum_{i=1}^{n} \alpha_i \cdot \sum_{j=1}^{M} 2^{(j-1)} \cdot Z_i^j$$

$$= \sum_{j=1}^{M} 2^{(j-1)} \cdot \sum_{i=1}^{n} \alpha_i \cdot Z_i^j = \sum_{j=1}^{M} 2^{(j-1)} \cdot S_j$$

where $2^{(j-1)}$ is equal to the weight of the $J^{st}$ bit, when calling $$S_j = \sum_{i=1}^{n} \alpha_i \cdot Z_i^j.$$

$S_j$ is the partial result corresponding to the $i^{st}$ bit. In other words $S_j$ is a partial contribution to the final result.

Thus, it appears that, if one knows the pulse response of the desired filter, the weighting factors $\alpha_i$ can be determined, then all the values of $S_j$ can be stored in a memory, taking into account the accuracy of the calculations. Then, the combination of the bits of the various taps of the shifting registers is used as an address to said memory. Then, the operation $\Sigma\ 2^{(j-1)}$. $S_j$ can be simply carried out by using an accumulator formed with a shifting register associated to a binary adder, or by using any other accumulator able to carry out this operation.

Therefore, it is possible to provide a PCM recursive filter in a simple way. In this case, the required ROM should have a capacity of $2^n$ words; the number of bits per word B determines the calculation error bound up with the difference equation.

An embodiment of the PCM filtering device as described above is shown on FIG. 2. A ROM or a RAM addressed by four bits and therefore, containing $2^4$=16 words corresponding to said partial results $S_j$, constitutes the central element of the filter. The address decoder of the ROM (AD Decoder) receives at its input, the bits affected with the same weight belonging to the elements of the difference equation defined above, and addresses a memory position supplying the result in parallel on the ROM output. The B bits coming from the ROM are transmitted to an adder A. The B bits coming from the adder and containing the output information Y(NT) are applied back to A through a stage carrying out a division by two or a shift to the right through a gate G controlled by a clock H.

After round off to M-bits, the output of stage A is serialized through CPS before being fedback to the shift registers C1 and C2. Each of the two elements C1 and C2 is formed itself with a shifting register with M bit positions. Thus, the output bit of register C1 constitutes, at any time, the bit of Y(NT-T) applied to input 1 of the ROM address decoder, while the one coming from C2 constitutes the bit of Y(NT-2T) applied to input 2 of said decoder. Inputs 3 and 4 of the decoder are respectively supplied with the bits of the PCM sample X(NT) which are sequentially transmitted, and with the ones coming from a shifting register C3 identical to C1 and C2. The bits are applied to input X at a rate of MxFs where Fs is the sampling frequency. Clock *H* resets accumulator *A* at sampling rate Fs.

This device i*a number of addressing inputs n*=4 corresponding to 16 ROM addresses. Therefore, at any time *t*, if *j* is the order of the processed bit of sample $Z_t$, Y can be written as follows:

$$Y=\sum_{j=1}^{M} 2^{(j-1)}x[\alpha_1 Z_1^j+\alpha_2 Z_2^j+\alpha_3 Z_3^j+\alpha_4 Z_4^j].$$

where $Z_1^j$, $Z_2^j$, $Z_3^j$ and $Z_4^j$ respectively, represent the bits with weight $2^{(j-1)}$ presents on time *t* at inputs 1, 2, 3 and 4 defined above. These bits can only be zero or one. For each configuration of the word $Z_1^j\ Z_2^j\ Z_3^j\ Z_4^j$, will correspond a single configuration of the sum $S_j$, partial contribution, according to the following table:

| $Z_1^j$ | $Z_2^j$ | $Z_3^j$ | $Z_4^j$ | $S_j$ |
|---|---|---|---|---|
| 0 | 0 | 0 | 0 | 0 |
| 0 | 0 | 0 | 1 | $\alpha_4$ |
| 0 | 0 | 1 | 0 | $\alpha_3$ |
| 0 | 0 | 1 | 1 | $\alpha_3+\alpha_4$ |
| 0 | 1 | 0 | 0 | $\alpha_2$ |
| 0 | 1 | 0 | 1 | $\alpha_2+\alpha_4$ |
| 0 | 1 | 1 | 0 | $\alpha_2+\alpha_3$ |
| 0 | 1 | 1 | 1 | $\alpha_2+\alpha_3+\alpha_4$ |
| 1 | 0 | 0 | 0 | $\alpha_1$ |
| 1 | 0 | 0 | 1 | $\alpha_1+\alpha_4$ |
| 1 | 0 | 1 | 0 | $\alpha_1+\alpha_3$ |
| 1 | 0 | 1 | 1 | $\alpha_1+\alpha_3+\alpha_4$ |
| 1 | 1 | 0 | 0 | $\alpha_1+\alpha_2$ |
| 1 | 1 | 0 | 1 | $\alpha_1+\alpha_2+\alpha_4$ |
| 1 | 1 | 1 | 0 | $\alpha_1+\alpha_2+\alpha_3$ |
| 1 | 1 | 1 | 1 | $\alpha_1+\alpha_2+\alpha_3+\alpha_4$ |

Thus, this shows that the ROM should contain 16 words which will be addressed by the word $Z_1^j\ Z_2^j\ Z_3^j\ Z_4^j$. Then, the words fetched out from the ROM should be added taking into account weight $2^{(j-1)}$. Now, the weighting operations can be obtained by simply shifting the corresponding word, after the result of the previous operations has been obtained, 1 bit position towards the lower orders, before adding the $j^{st}$ word fetched out during the previous operations. In fact, the system described with reference to FIG. 2 proceeding by iterations, performs successive storages and the above operation is carried out by shifting the previous result one position to the right and by adding the result of this operation to the new word $S_j$ fetched out from the ROM. These operations are carried out by the adder A looped through the dividing by-two stage providing the right hand shift. In addition, truncating will be performed by taking the M more significative bits of the overall result taking into account the standardization adopted for the maximum value obtained on the partial sum which determines the point position, rounding will be performed by adding 0.5 to the M. bit word so obtained.

The device described above for filtering PCM data can, in fact, be applied to Δ signals, provided some modifications of details which will be indicated later.

However, the PCM or Δ signals can be positive or negative and the system just described did not show, up to now, any provision for this fact. In fact, if the signals are in binary code called "Two's complement," the bit of $S_j$ occupying order M, therefore, the highest order, is the only one indicating the signal: if it is equal to "1," this means that its contribution to the calculation to be carried out in the accumulator should be subtracted. This requires the use of a ROM not only containing the values $S_j$, but also the values $-S_j$. The required ROM capacity is then twice the one provided above. It is possible to overcome these constraints and to, keep only $2^n$ words memorized in several ways; some of these methods use the specific properties of the two's complement code, the other ones use a different code.

Several solutions exist in the first case, two of which have been use here. The first one uses the property by which the value of a number written in two's complement remains unvarying for all extension of the word towards high weights (extension to the left), by repeating the last written bit. In fact, in said code, the contribution of the bit affected with the highest weight is negative while the one of the other bits are positive. Then, it should be easily understood that the value of the number written in two's complement does not vary by extension to the left since this means only applying the property:

$$-a_M\times2^{M+1}+a_M\times2^M=-a_M\times2^M$$

applicable what *M* and bit $a_M$ may be.

In another way, it is proved that if the sign bit of the multiplier factor of a multiplication of two two's complement numbers is repeated as many times as the number of bits B of the multiplicand, the multiplication can be carried out independently of the sign bit. Consequently, the problem indicated above can be resolved in this case by extending the length of word $Z_t$ to *M+B* bits by repeating the sign bit. In fact, the accumulator capacity may be unmodified provided that the value scale is choosen so that, after round off operations, the loss of *B* bits with the lower weights is not significant since it comes to omit the fractional values. However, this processing mode is slow since it requires *B* elementary times more than expected by the device described above.

The second device using the two's complement code properties, uses the possibility of obtaining the correct result at the end of accumulation process by substracting the bit, sign contribution $S_j$, (*J=M*), if this bit corresponds to a binary "1" and therefore indicates a negative sign. It is obvious that the immediate solution enabling the application of this process, consists in doubling the ROM capacity by adding to the $2^n$ values of $S_j$ previously recorded, the corresponding negative values and by distinguishing the presence of signs at $M^{st}$ weight by adding a *n*+1 address bit to the ROM. In fact, this memory extension is avoided by using an index detecting the presence of the sign bits. Then partial contribution $S_j$ for *j=M* fetched out from the ROM corresponding to the value contained in address $Z_1^M\ Z_2^M$ ... $Z_n^M$ should be made negative before accumulation. For that purpose the *B* bits of the content of address $Z_1^M\ Z_2^M$.. $Z_n^M$ are complemented and binary "1" is added to the result. This last solution is very advantageous since it requires a much more short processing time than the previous one, while using a ROM of equivalent capacity, i.e. a capacity of 16 words for the given example.

This capacity may be reduced once more by combining the use of a Modified two's-complement Internal Code (CIM) with the indexing techniques already used as it will be explained below. The value of any two's complement coded number ($Z$) can be given as follows (to make the explanation more simple, only integers are considered; in fact, the argument may be as well applied to the fractional numbers):

$$\{Z\} = -z_M x 2^{(M-1)} + \sum_{k=1}^{M-1} 2^{(k-1)} \cdot z_k$$

where $M$ is the number of bits of word ($Z$) and $z_k$ or $z_M$, the binary value of the bit according to its rank. In CIM Code, this same word would be written, taking into account the logic identity $1 = Z_k = Z_k$ and by substituting $Z_M$ for $Z_M$ :

$$\{Z\} = \sum_{k=1}^{M} 2^{(k-2)} (z_k - \bar{z}_k) + 2^{-1} (z_o - \bar{z}_o)$$

where $z_o = 0$.

These two equations show that the CIM coded word can be easily deduced from the two's complement coded word by assigning a bit $z_o$=0 to the rank of order zero and weight $2^{-1}$ therefore representing an extra bit EB; by reproducing all the $M$ two's complement bits without modification except for the one of the highest order $Z_M$ which is complemented and by reducing the weights of these M bits by one. Therefore, the CIM coded words have one bit more than the ones written in two's complement code.

by calling $$S_j = \sum_{i=1}^{n} \alpha_i x' (Z_i^j - \bar{Z}_i^j)$$

and $$S_o = -(\alpha_i + \alpha_2 + \ldots \alpha_n)$$

the partial result corresponding to the $j^{st}$ bit $$Y = \sum_{j=1}^{M} 2^{(j-2)} x S_j + 2^{-1} x S_o$$

Therefore, it is sufficient to dispose of the values of $S_j$ and $S_o$.

The above expression shows that once $Z_i$ has been CIM coded, the memory will have to contain all the combinations $\Sigma \pm\alpha_i$. In this case, the memory words written in two's complement code at addresses (0) and (15) of the table are fetched out under control of the $Z$ address words and successively accumulated after shifting whatever the corresponding weight may be. Then, the accumulator has not to detect when $j$=$M$, but any word fetched out from the memory may be either positive or negative whatever $j$ may be, as shown below.

| Non-modified address | $Z_1^j$ | $Z_2^j$ | $Z_3^j$ | $Z_4^j$ | $S_j$ |
|---|---|---|---|---|---|
| (0) | 0 | 0 | 0 | 0 | $-(\alpha_1+\alpha_2+\alpha_3+\alpha_4)$ |
| (1) | 0 | 0 | 0 | 1 | $-(\alpha_1+\alpha_2+\alpha_3-\alpha_4)$ |
| (2) | 0 | 0 | 1 | 0 | $-(\alpha_1+\alpha_2-\alpha_3+\alpha_4)$ |
| (3) | 0 | 0 | 1 | 1 | $-(\alpha_1+\alpha_2-\alpha_3-\alpha_4)$ |
| (4) | 0 | 1 | 0 | 0 | $-(\alpha_1-\alpha_2+\alpha_3+\alpha_4)$ |
| (5) | 0 | 1 | 0 | 1 | $-(\alpha_1-\alpha_2+\alpha_3+\alpha_4)$ |
| (6) | 0 | 1 | 1 | 0 | $-(\alpha_1-\alpha_2-\alpha_3+\alpha_4)$ |
| (7) | 0 | 1 | 1 | 1 | $-(\alpha_1-\alpha_2-\alpha_3-\alpha_4)$ |
| (8) | 1 | 0 | 0 | 0 | $+(\alpha_1-\alpha_2-\alpha_3-\alpha_4)$ |
| (9) | 1 | 0 | 0 | 1 | $+(\alpha_1-\alpha_2-\alpha_3+\alpha_4)$ |
| (10) | 1 | 0 | 1 | 0 | $+(\alpha_1-\alpha_2+\alpha_3-\alpha_4)$ |
| (11) | 1 | 0 | 1 | 1 | $+(\alpha_1-\alpha_2+\alpha_3+\alpha_4)$ |
| (12) | 1 | 1 | 0 | 0 | $+(\alpha_1+\alpha_2-\alpha_3-\alpha_4)$ |
| (13) | 1 | 1 | 1 | 1 | $+(\alpha_1+\alpha_2-\alpha_3+\alpha_4)$ |
| (14) | 1 | 1 | 1 | 0 | $+(\alpha_1+\alpha_2+\alpha_3-\alpha_5)$ |
| (15) | 1 | 1 | 1 | 1 | $+(\alpha_1+\alpha_2+\alpha_3+\alpha_4)$ |

same address; the index on $\alpha_1$

By applying this code for $Z_i$ in the calculation of $Y$, we obtain:

$$Y = \sum_{i=1}^{n} \alpha_i Z_i$$

$$Z_i = \sum_{j=1}^{M} 2^{(j-2)} x (Z_i^j - \bar{z}_i^j) - 2^{-1}$$

$$Y = \sum_{i=1}^{n} \sum_{j=1}^{M} \alpha_i \cdot 2^{(j-2)} x (Z_i^j - \bar{Z}_i^j) - 2^{-1}\alpha_i.$$

$$Y = \sum_{j=1}^{M} 2^{(j-2)} x \sum_{i=1}^{n} \alpha_i x (Z_i^j - \bar{Z}_i^j) - 2^{-1} \alpha_i$$

The symmetry appearing on the above table shows that it is enough to store eight words instead of 16 to have all possible combinations. The bit $Z_1^j$ may be used as an index to complement the address supplied by the word $Z_2^j$ $Z_3^j$ $Z_4^j$ on the one hand, and change the signal of $S_j$ on the other hand, whatever $j$ may be, whenever $Z_1^j$=c 1. These operations may be carried out by using XOR circuits.

In fact, this table shows that indexing may be as well performed by using any one of bits $Z_1^j$, $Z_2^j$, $Z_3^j$ or $Z_4^j$, the other ones being used as an address.

Figure 2:
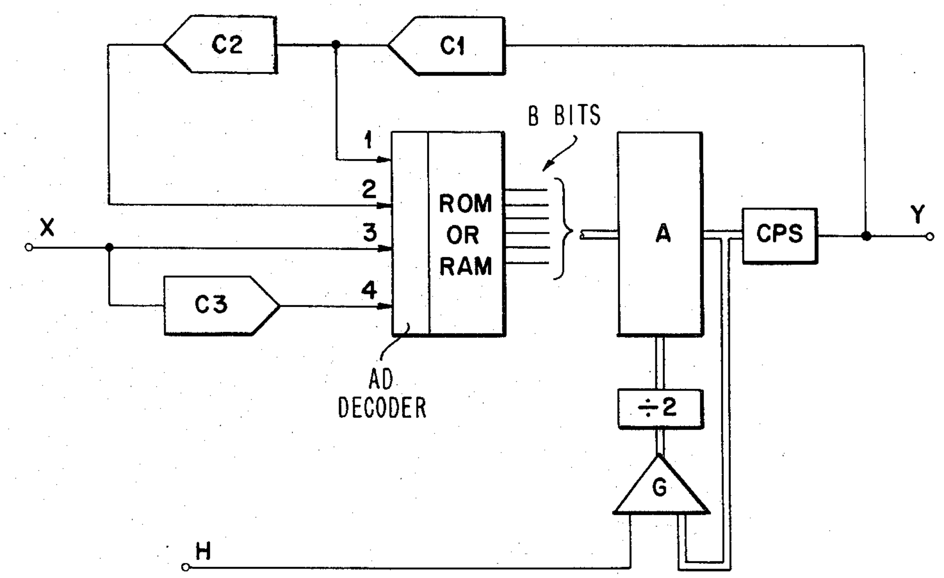
FIG. 2 shows the functional diagram of a recursive filter in accordance with this invention, for PCM coded data.

The diagram of FIG. 2 should be modified to be adapted to the CIM code. For this purpose, it is enough to increase the capacity of register C1 to C3 by one bit and to equip the serializer CPS with a converter of two's complement code into CIM code, (the bit with the lowest weight, being at round off time replaced by 0; the sign bit being complemented), to inhibit the division by two (shifting operation) for the bit of the lowest order by using a gate G′ controlled by clock H every M+1 bits. It should be clearly understood that X(NT) should be previously coded CIM.

Figure 3:
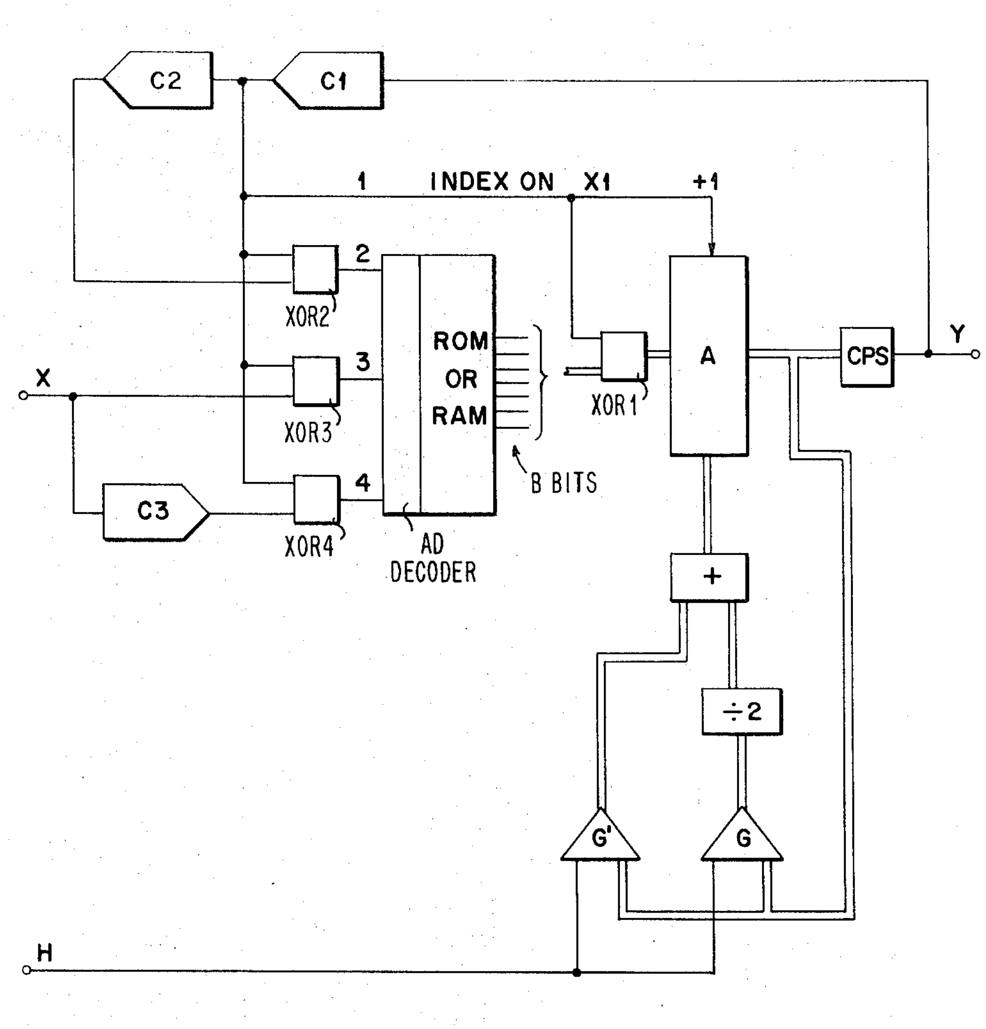
FIG. 3 shows the functional diagram of a recursive filter in accordance with this invention.

Thus, the circuit of FIG. 2 has been modified to perform these operations, which permits to obtain the diagram of FIG. 3. On this figure, the bits $Z_2^j$, $Z_3^j$ and $Z_4^j$, before being used to address the memory, go through circuits XOR2, XOR3 and XOR4 respectively, the second output of which is supplied by index $Z_1^j$, which complements them when this last bit is a binary "1."

In addition, the sign of the word written in two's complement using B bits, fetched out from the memory should also be modified if $Z_1^j = 1$ since the memory contains only one half of the partial contributions. For this purpose, said B bits and the index are submitted to a XOR logic operation by using XOR1 circuit, then a binary "1" is added to the result through the accumulator.

Figure 4:
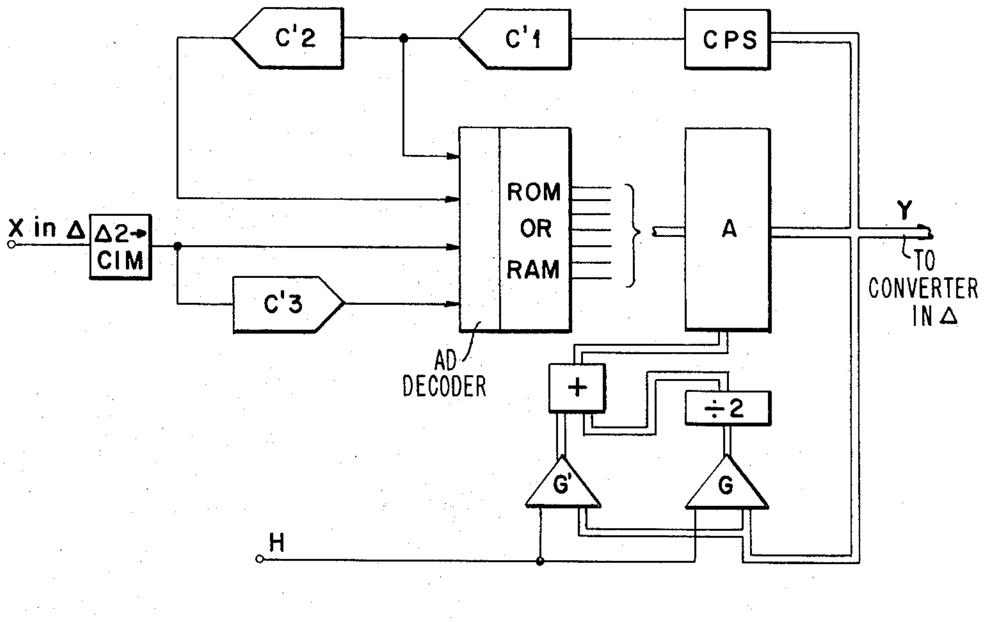
FIG. 4 shows the functional diagram of a recursive filter in accordance with this invention, for Δ coded data.

The design of the digital filter described above is not only applicable to the PCM modulation, but also to the Δ modulation transcoded in PCM. In this case the patent application indicated above has shown that the information delivered by the ROM are in multilevel Δ modulation and that they should be re-coded before being re-injected into the feedback section of the filter. This explains a presence of the Δ to CIM converter in the device of FIG. 4, included in the CPS circuit. In the same way, the ROM addressing bits should all be in the same code and the Δ information coded in PCM, is converted into CIM code by Δ2 → CIM.

Although the description of the invention has been carried out with reference to the recursive type filters, the above calculations can also apply to a transversal filter. This filter is even more simple than the recursive filter since it comprises only the "direct" section.

Figure 5:
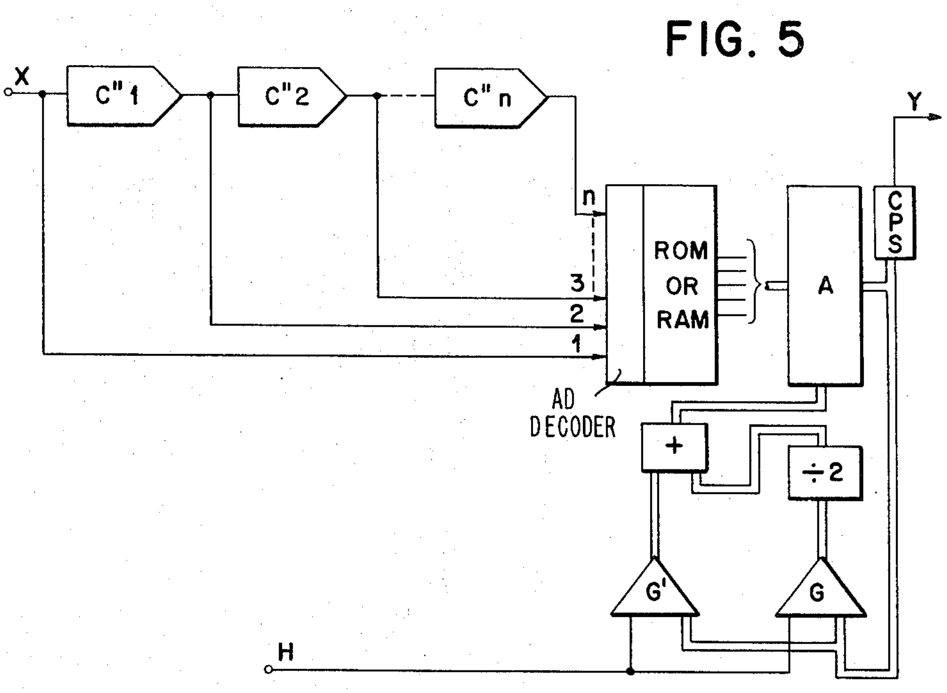
FIG. 5 shows the functional diagram of a transversal filter according to this invention.

Thus, starting from the device of FIG. 2, one attains easily the device of FIG. 5. The PCM coded signal is aplied to the input of delay line C″1, C″2, ... C″n. The bits appearing at the input of the ROM decoder are used to address the ROM. The process for fetching out words from ROM and accumulating them is identical to the one described above.

Figure 6:
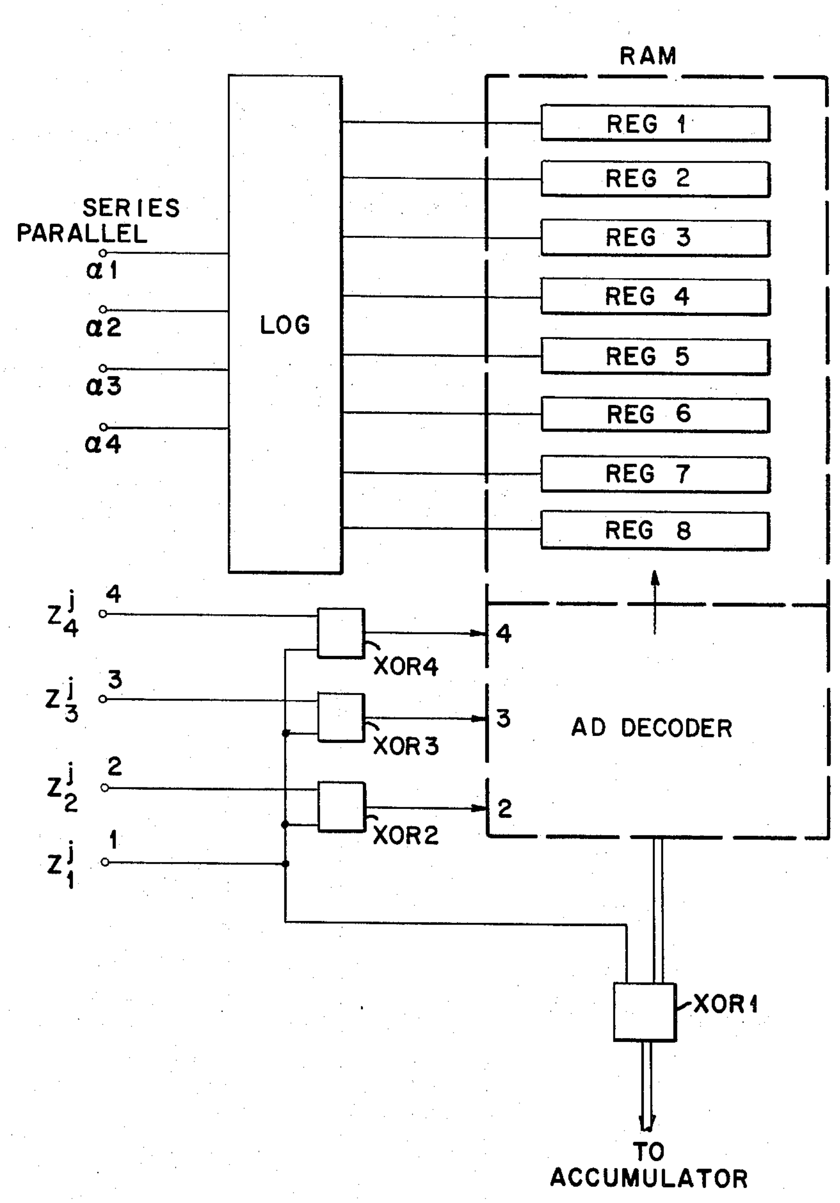
FIG. 6 shows the functional diagram of a filter made in accordance with this invention and using a RAM.

In certain applications, it is useful to dispose of a device, the weighting factors of which can be modified while enabling an operation in real time. For example, it is the case of the equalizing devices to be placed on transmission lines. Then, the use of a ROM is no longer possible but the advantages provided by the availability of the partial contributions should be kept. Then, a solution consisting in the use of a RAM enables to resolve the problem. The RAM registers are used to store the partial contributions which can be modified if required, before any use of the device, due to the presence of a logic circuit. FIG. 6 shows the functional diagram of an embodiment of the filter of such a design. Factors $\alpha_1$, $\alpha_2$, $\alpha_3$ and $\alpha_4$ are transmitted to a LOG stage equipped with computing stages supplying the values of the partial contributions $S_j$ figuring on the above table and previously recorded in the device of FIG. 3 at addresses (0) to (8). These words are stored in registers Reg 1 to Reg 8 of the RAM. Everything being equal everywhere else, the operation of the device of FIG. 6 is similar to the one of FIG. 3 in all points.

Each device of this invention uses an accumulator in which shifting operations are carried out. It is obvious that the fact of intending to operate in real time considerably restricts the choice of this accumulator. In fact, the overall mathematical operation to be carried out by the memory and accumulator assembly corresponding to a series-parallel multiplication of two facteurs $\alpha_n$ $\alpha n^{-}1 \ldots \alpha_1$ and $Z_n$ $Z_n^{-}{}_1 \ldots Z_1$, the factor in $\alpha$ appearing in parallel and the one in Z appearing in series, being understood that each figure $\alpha_i$ and $Z_i$ ($i$ varying from 1 to $n$) is written in binary code. In particular, this operation may be carried out by using a parallel-series accumulator (parallel input-series output) described by Mr. Richards in its book "Arithmetic operations in digital computers" (1955), serial-parallel multiplication, p. 155,provided that some adaptations are applied to this circuit.

Figure 7:
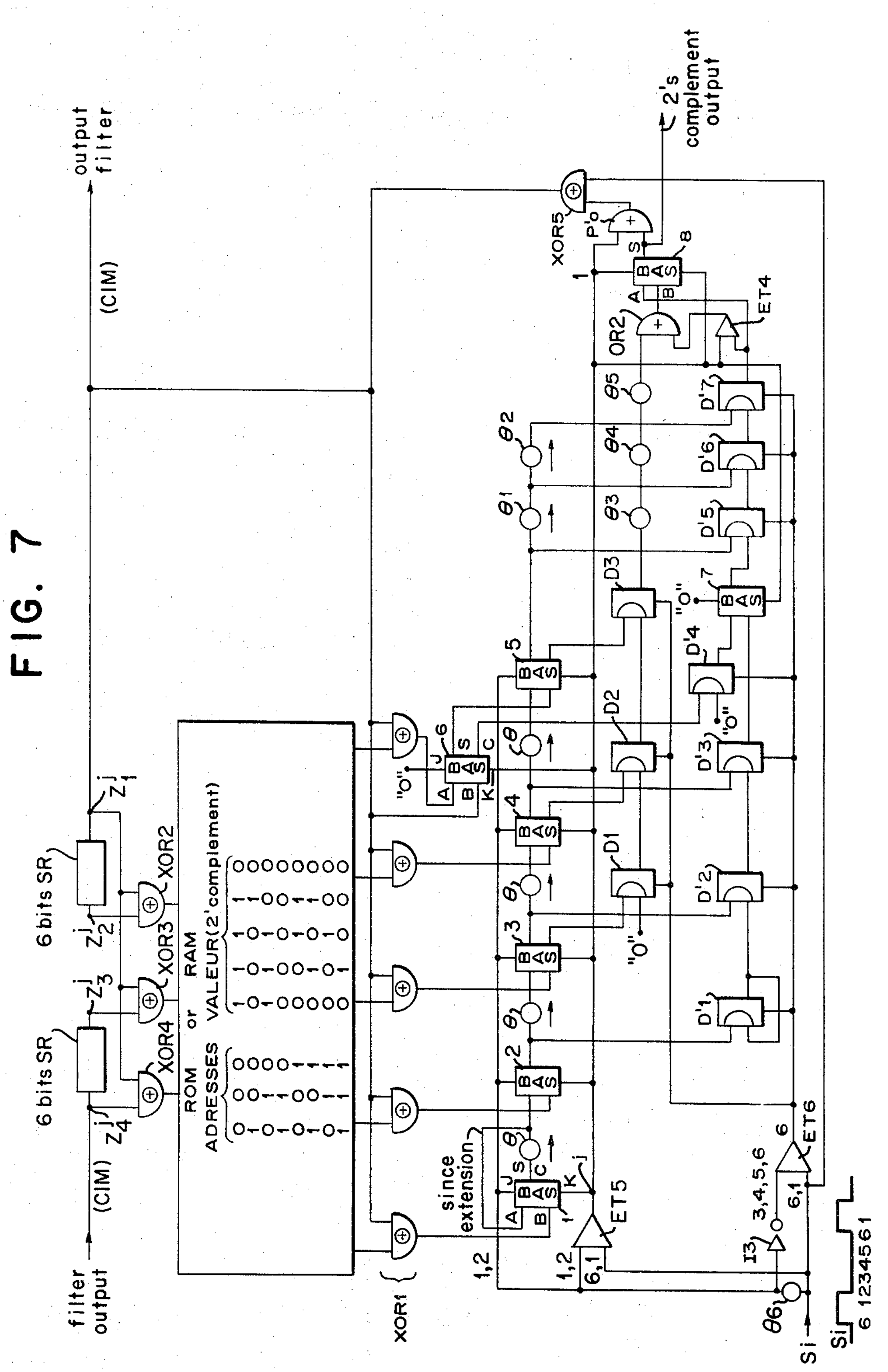
FIGS. 7, 7*a* and 7*b* show a diagram of a recursive filter in accordance with this invention.
Figure 7A:
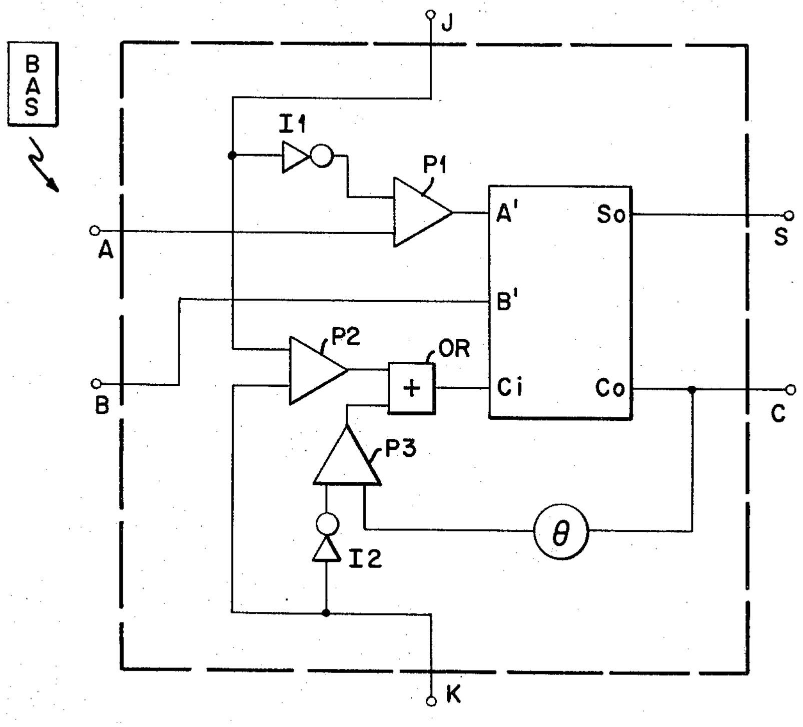

The diagram of FIG. 7 shows a filter similar in all points to the one of FIG. 3 in which register C1 has been removed since the accumulator introduces already a delay equivalent to a word duration, but shows the accumulator structure. First, it should be recalled that the words of said registers are in CIM code with $M+1$ bits, (6 in this case), the ones contained in the memory are in two's comlement with B bits (5 in this case). Thus, the accumulation operations corresponding to the mathematical operation indicated above are performed in two's complement code and the result should be converted in CIM code before being introduced in register C2.

The basic element of this accumulator is a module (BAS) shown on FIG. 7$a$. It comprises a full adder having two data inputs A′, B′, a carry input Ci and two outputs So and Co, these two outputs corresponding respectively to the sum and carry outputs of said adder. The module BAS is equipped with two data inputs A and B, two control inputs J and K and two outputs S and C. Outputs S and C are connected respectively to the sum and carry outputs of said adder. Input B is connected directly to B′; input A is connected to A′ through a gate P1 controlled by the signal applied to J after complementation by I1. The signals on J and K are transmitted to input Ci througha gate P2 and an OR circuit with two inputs. The carry signal of the adder appearing in Co, is delayed of a bit time 8 by using a delay element and re-applied to input Ci through the second input of the OR circuit and a gate P3 controlled by the signal introduced in K and complemented by I2.

The accumulator device is obtained by connecting several BAS stages in cascade, the output S of one stage being connected to input A of the following stage through a delay element 8, and by introducing in parallel on the inputs B, the results of said partial contributions fetched out from the memory.

Thus, the outputs of the various stages of XOR1 are connected respectively and directly to input B of a stage BAS1 to BAS4. The output of the stage carrying the bit with the lowest weight of the word issued from XOR 1 is connected to input B of BAS5 through BAS6 receiving on the one hand said bit affected with the lowest weight on its input A and, on the other hand, bit $Z_1^j$ on its input B. The intermediate stage BAS6, the input J of which is at "0" and the input K of which is connected to inputs K of BAS1 to BAS5, is used to add the binary "1" corresponding to the change of sign indicated above in the description of FIG. 3, when $Z_1^j=1$. Thus, the XOR1 and BAS6 assembly changes the sign of the partial contribution fetched out from the memory, when necessary.

At each bit time, the bit affected with the lowest weight of the result of the accumulation is ejected by shifting the sum information to the right, which corresponds to the division by two indicated on FIG. 3. In the same time, the sum information of each stage BAS is transferred on input A of the following stage after a bit time delay. Then, the accumulator is ready to receive the next partial contribution on the inputs B and to repeat the previous operation until all bits of word $Z_i$ are used.

Several observations enable an improvement of this accumulator while providing a letter adaptation to the particular needs of this invention.

First of all, one should recall the above observations concerning the processing of the partial contributions due to the presence of the sign of the words written in two's complement code: it has been indicated above that it is sufficient, for carrying this processing, to extend the word to the left by performing M repetitions of the bit affected with the highest weight (sign bit). In fact, the operations being carried out in the successive accumulation steps, it is sufficient to extend this sign bit of one position only on each accumulation. Then, the left hand extension does not require any additional BAS stage; for simulating this extension, it is sufficient to feed the delayed output S of BAS1 directly back to its input A as shown on FIG. 7.

Secondly, a rational use of the device in general, and of the memory in particular, involves the choice of a memory location reserved to the partial contribution.

$$\sum_{i=1}^{n} |\alpha i|$$

which does not exceed the one which would require the number corresponding to the two's power immediately above said contribution. This operation constitutes a "standardization" which determines the position of the point in the accumulation result, and determines a rank $p$ equal to the base-two logarithm of said power ($p$ can be positive or negative). In the case of FIG. 7, $p=2$ and $B=5$, therefore, the maximum partial contribution is equal to three-point-seventy five, which requires, to standardize the result, to neglect the contents of BAS1 and BAS2 at the end of the accumulating process since then, they cannot contain any significant figure for the result.Taking into account the two's complement code properties, these stages can only contain an extension of the sign bit of said partial contribution and therefore may be delated.

The Z word in CIM code containing $M+1$ bits, corresponds to a two's complement word with M bits, i.e. five bits for the example shown on FIG. 7. This explains the presence of 81. In addition, the final result is rounded off and the calculation which leads to this result, again requires an additional bit and this explains the presence of 82.

Thirdly, after $M+1$ bit times, the processing of a $Z$ word is terminated for the memory but the accumulator is not empty= $B-p$ bits remain to be used. The filter slowing down which could result, is avoided by providing two registers R1 and R2 and two stages BAS7 and BAS8 which will terminate the operation and enable the release of BAS1 to BAS6.

Figure 7B:
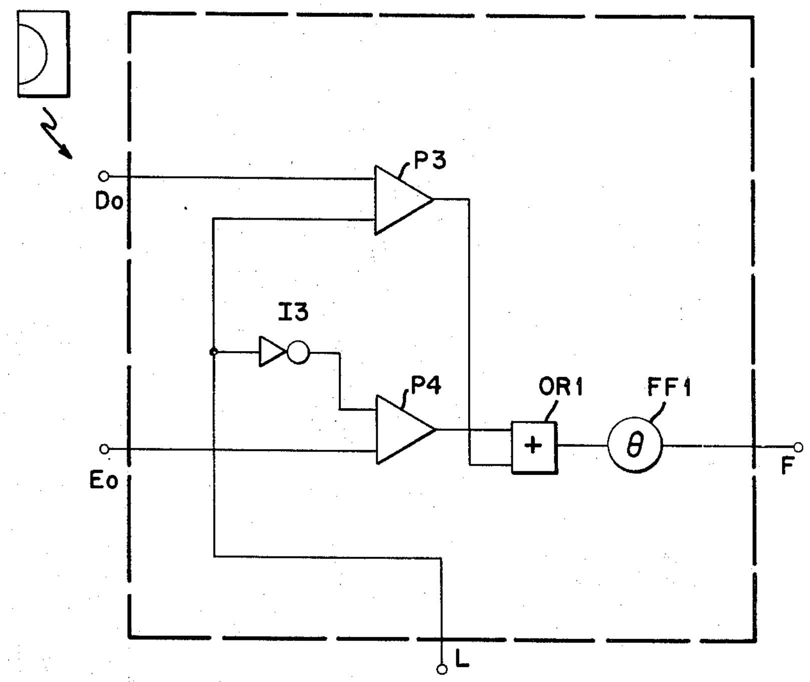

Registers R1 and R2 consist of stages D similar to the one shown on FIG. 7b and including two data inputs Do and Eo, a check input L and an output F. Each stage includes a latch FF1 operating as a bit time 8 memory element the output of which is connected to point F and the input of which $i$ is connected to the output of an OR logic circuit (OR1) with two inputs. Inputs Do and Eo feed a gate P3 and P4 respectively, controlled by the signal at L or its complement supplied by I3. The outputs of P3 and P4 feed OR1.

Register R1 consists of stages D1, D2, D3 and of latches — 83, 84, 85 connected in cascade. Its output is taken from the output of 85.

Register R2 includes stages D'1 through D'7 and stage BAS7. Its input is taken from the output of D'7.

The inputs Do of stages D1 to D3 are connected to the outputs C of BAS3 through BAS5. Input Eo of D1 is at "0", the ones of D2 and D3 are connected to output F of the previous stage D belonging to the same register. The output of R1 is obtained by connecting — 83, 84, 85 in cascade to the output of D3.

The inputs Do of stages D'1 through D'3 are connected to outputs S of BAS 2 through BAS4 respectively. The inputs Eo of D'2 and D'3 are connected to outputs F of the previous stage D of R2, respectively. Points F and Eo of D'1 are interconnected. Output C of BAS6 is connected to Do of D'4 the outpu EO of which is at zero level. Outputs F of D'4 and D'3 are connected to inputs A and B of BAS7 respectively, input J of which is at zero and input K of which is common to inputs K of BAS1 through BAS6. The rest of register R2 is constituted of D'5, D'6, D'7, inputs Do of which are connected to output S of BAS5 and to outputs F of D'5 and D'7 respectively. The output of 85 is connected to input B of BAS8 through logic circuit OR2, the second input of which, is connected to the output of D'7 through a logic AND circuit ET 4, inputs K and J of BAS8 are common with K of BAS1 to BAS7. The output of D'7 is applied to input A of BAS8. Output S of BAS8 is connected to an input of an OR logic circuit Po', the output of which is connected to an input of a XOR5 feeding the input of register C2. The synchronisation of the device is obtained by using a binary signal Si equal to "1" at the moments corresponding to the processing of extra bits E/B and $Z_M$ (in the case shown on the figure, words in CIM code arrive in synchronous mode and comprise six bits, therefore $Si=1$ at bit times 1 and 6) and equals zero for the other bit times of each word Z. Signal $Si$ is transmitted directly on the second input of XOR5. It is also transmitted after a delay of one bit time, through 86 (therefore the output of 86 is equal to 1 at times 1 and 2), to input J of stages BAS1 through BAS5. The coincidence information of signals Si and its delayed counterpart, goes through a logic AND circuit ET 5 (therefore, the output of ET5 is equal to 1 on time 1), and drives inputs K of stages BAS1 through BAS8 as well as input J of the latter. Signal Si, delayed of a bit time and complemented by I3 is placed in coincidence with Si in ET6 (therefore the output of ET6 is equal to 1 at time 6 which corresponds to $Z_M$); the result drives inputs L of stages D1 through D3 and D'1 through D'7. The output of ET5 drives the second input of ET4.

At the moment corresponding to an operation of $M+1$ order (therefore at time 6), the data being transmitted in a synchronous mode, stages BAS1 through BAS7 should be released to be able to begin the calculation of the next Y value. The control logic signal transfers the sum and carry information of the accumulator stages in registers R1 and R2; on the following time (time 1) the partial contribution fetched from the memory which corresponds to the all zero address is multiplied by 2 to take into account the weight assigned to the first bit in CIM code by forcing the carry inputs of BAS1 through BAS5 at 1 (presence of J and K) which transfers this contribution into the corresponding carry outputs. The sum obtained at S is neglected at the next time slot (presence of J).

Therefore, the operation of the device may be summed up as follows: during each bit time, a partial contribution is fetched out of the memory under control of word $Z_2^j Z_3^j Z_4^j$ and its sign is modified if $Z_1^j = 1$, using XOR1 and BAS6. The bits of the fetched out memory word, are introduced in parallel into accumulator section BAS1 through BAS5 (via BAS6, for BAS5). During each bit time, the sum content of each stage BAS1 through BAS5 is shifted to the right, but at the first bit time, the partial contribution is multiplied by 2, the sum of stage BAS1 being fedback to the input of the same stage after a delay of one bit time. After $M+1$ bit times, the sum and carry contents of stages BAS2 through BAS6 are transfered into the stages of registers R1 and R2 and stages BAS may be reloaded for a next accumulation. During this time, the contents of R1 and R2 are added in series in BAS8, and the result converted in CIM code by Po and XOR5 is reinjected into C2. In fact, the words in CIM code having one bit more than those in two's complement code, i.e. $EB=0$, a round off is carried out through BAS8 on the time corresponding to EB by forcing the carry input of BAS8 to 1 (simultaneous presence of J and K) and by systematically replacing the bit of XOR5 by zero before its reinjection into C2.

The filter output may be fetched out either from output S of BAS8, therefore in two's complement code, or from the output of XOR5, therefore in CIM code.

Thus, the device described above enables to carry out — in real time —the accumulation, code conversion and standardization operations required by the filter of this invention, but it should be understood that this invention is not restricted to this embodiment.

In addition, it will be understood by those skilled in the art that the foregoing and other changes in form and details may be made therein without departing from the spirit and the scope of the invention. In particular, more complex filter transfer functions may be provided by setting devices such as the ones described above, in cascade or in parallel.

What is claimed is:

1. A digital apparatus for filtering successive binary coded signal samples $Z_i$, $Z_i$ being of the form $$2^{m-1}Z_i^m + 2^{m-2}z_i^{m-1} + \ldots + 2^{2-1}Z_i^j + \ldots 2^0 Z_i^1 = \sum_{i=1}^{m} 2^{j-1} Z_i^j;$$

wherein the output value Y of the filter apparatus is related to $Z_i$ by the function:

$$Y = \sum_{i=1}^{N} a_i Z_i = \sum_{i=1}^{N} a_i \sum_{j=1}^{M} 2^{j-1} Z_i^j = \sum_{j=1}^{M} 2^{j-1} \sum_{i=1}^{N} a_i Z_i^j = \sum_{j=1}^{M} 2^{j-1} S_j,$$

each $a_i$ constituting a weighting coefficient and $$S_j = \sum_{i=1}^{N} a_i Z_i^j;$$

the apparatus comprising:

means adapted to receive N successive signal samples $Z_i$;

a memory medium having $2^N$ locations addressable by the signal subset $Z_1^j Z_2^j \ldots Z_N^j = Z_1^{j+1} Z_2^{j+1} — Z_N^{j+1} = Z_1^m Z_2^m — Z_N^m$ for storing corresponding values Sj;

an accumulator for forming the product $2^{j-1}$Sj and combining the product to form the sum $$\sum_{j=1}^{m} 2^{j-1} Sj;$$

and means coupling the receiving means and sequentially responsive to each signal subset $Z_1^j Z_2^j \ldots Z_N^j$ over the range $1 \leq j \leq m$ for extracting the value Sj from the memory medium at the address defined by the subset, and for applying said value Sj to the accumulator.

2. A digital apparatus according to claim 1, wherein each of the signal samples are generated at a rate of 1/T samples per second, and further wherein the N binary coded signals $Z_i$ consist of V input signals X(NT), X(NT-T),---, X[NT-(V-1)T] and R output signals Y(NT-T), Y(NT-2T), ---, Y[NT-(R-1)T];

the receiving means including means for applying a corresponding bit from each of the input signals $X_i^j$ (NT), $X_i^j$ (NT-T), ----$X_i^j$ [NT-(V-1)T] and from each of the output signals $Y_i^j$(NT-T), $Y_i^j$(NT-2T),---$Y_i^j$ [NT-(R-1)T] to the extracting means over the range $1 \leq j \leq m$.

3. A digital apparatus according to claim 1, wherein each of the signal samples are generated at a rate of I/T samples per second, and further wherein the N binary coded signals $Z_i$ consist of N input signals (X(NT), X(NT-T)--- X[NT-(NT-1)];

the receiving means including means for applying a corresponding bit from each of the input signals $X_i^j$ (NT), $X_i^j$(NT-T), ---$X_i^j$ [NT-(NT-1)] to the extracting over the range $1 \leq j \leq m$.

4. A transversal digital filter comprising:

means adapted to receive N successive binary coded input digits X(NT), X(NT-T),---X[NT-(NT-1)] of $m$ bits each at a rate of 1/T digits per second;

said filter output Y(NT) being related to the input digits by the function:

$$Y(NT) = a_1 X(NT) + a_2 X(NT\text{-}T) \text{---} a_N X[\text{NT-(NT-1)}]$$

$$= \sum_{i=1}^{N} a_i X_i; \text{ each digit } X_i = 2^{m-1} X_i^m + 2^{m-2} X_i^{m-1} + \ldots + 2^{j-1} X_i^j + \ldots + 2^0 X_i^1 = \sum_{j=1}^{m} 2^{j-1} X_i^j; \text{ such that}$$

$$Y(\text{NT}) = \sum_{i=1}^{N} a_i X_i = \sum_{i=1}^{N} a_i \sum_{j=1}^{m} 2^{j-1} X_i^j = \sum_{j=1}^{m} 2^{j-1} \sum_{i=1}^{N} a_i X_i^j = \sum_{j=1}^{m} 2^{j-1} Sj,$$

$$Sj = \sum_{i=1}^{N} a_i X_i^j,\ a_i \text{ being a weighting coefficient;}$$

said filter further comprising:

a memory medium having $2^N$ locations for storing values of Sj addressable by signal subsets $X_1^j X_2^j$ ---$X_N^j$ over the range $1 \leq j \leq m$;

an accumulator for forming the product $2^{j-1}$Sj and combining the product to form the sum $$\sum_{j=1}^{m} 2^{j-1} Sj;$$

and means responsive to successive signal subsets $X_1^j X_2^j$ --- $X_N^j$ from the receiving means over the range $1 \leq j \leq m$ for extracting the corresponding value Sj from the memory medium at the address defined by the signal subset and for applying said extracted value to the accumulator.

* * * * *